US011632425B2

(12) United States Patent
Ellegaard

(10) Patent No.: US 11,632,425 B2
(45) Date of Patent: *Apr. 18, 2023

(54) SYNCHRONIZATION OF SEQUENCE NUMBERS IN A NETWORK

(71) Applicant: Microchip Technology Incorporated, Chandler, AZ (US)

(72) Inventor: Lars Ellegaard, Copenhagen (DK)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/445,523

(22) Filed: Aug. 20, 2021

(65) Prior Publication Data

US 2021/0385274 A1 Dec. 9, 2021

Related U.S. Application Data

(63) Continuation of application No. 16/948,908, filed on Oct. 5, 2020, now Pat. No. 11,108,860.

(60) Provisional application No. 62/982,654, filed on Feb. 27, 2020.

(51) Int. Cl.
*H04L 67/1095* (2022.01)
*H04L 43/0805* (2022.01)
*H04L 43/16* (2022.01)
*H04L 67/62* (2022.01)

(52) U.S. Cl.
CPC ...... *H04L 67/1095* (2013.01); *H04L 43/0805* (2013.01); *H04L 43/16* (2013.01); *H04L 67/62* (2022.05)

(58) Field of Classification Search
None
See application file for complete search history.

(56) References Cited

U.S. PATENT DOCUMENTS

| 7,167,926 | B1 | 1/2007 | Boucher et al. | |
|---|---|---|---|---|
| 2005/0141565 | A1* | 6/2005 | Forest | H04L 12/44 370/503 |
| 2007/0053341 | A1* | 3/2007 | Lizzi | A61B 5/0002 370/503 |
| 2008/0037420 | A1* | 2/2008 | Tang | H04L 1/1854 370/231 |
| 2011/0161538 | A1 | 6/2011 | Decker | |
| 2013/0297974 | A1 | 11/2013 | Milks et al. | |

(Continued)

OTHER PUBLICATIONS

Mirja et al., "A path layer for the Internet: Enabling network operations on encrypted protocols", Nov. 1, 2017, 2017 13th International Conference on Network and Service Management (CNSM) (pp. 1-9, part IV) (Year: 2017).*

(Continued)

*Primary Examiner* — Davoud A Zand
(74) *Attorney, Agent, or Firm* — TraskBritt

(57) ABSTRACT

Methods of synchronizing sequence numbers of a number of devices of a network are disclosed. A method may include incrementing, at each of a first device and a second device of a network, a sequence number, wherein the sequence number is indicative of a number of frames generated at the associated device since the timing event. The method may also include inserting, at each of the first device and the second device, the sequence number into an associated frame. Related networks and devices are also disclosed.

20 Claims, 10 Drawing Sheets

(56) References Cited

U.S. PATENT DOCUMENTS

| | | | |
|---|---|---|---|
| 2013/0343377 A1* | 12/2013 | Stroud | ............... H04L 45/7453 370/389 |
| 2018/0013685 A1 | 1/2018 | Yu et al. | |
| 2018/0317089 A1 | 11/2018 | Levesque et al. | |
| 2018/0332434 A1 | 11/2018 | Kulkarni et al. | |
| 2019/0246353 A1 | 8/2019 | Jensen et al. | |

OTHER PUBLICATIONS

Rojas-Cessa et al., "Schemes for Fast Transmission of Flows in Data Center Networks", Jul. 1, 2015, IEEE, IEEE Communications Surveys & Tutorials (vol. 17, Issue: 3, pp. 1391-1422) (Year: 2015).*
Araujo et al., "Memory requirements analysis for PRP and HSR hardware implementations on FPGAs", IECON 2013—39th Annual Conference of the IEEE Industrial Electronics Society (Nov. 2013) pp. 2297-2302.
Araujo et al., "PRP and HSR for High Availability Networks in Power Utility Automation: A Method for Redundant Frames Discarding", IEEE Transactions on Smart Grid, vol. 6, No. 5 (Sep. 2015) pp. 2325-2332.
Hubert et al., "Seamless and low-cost redundancy for substation automation systems (high availability seamless redundancy, HSR)", Power and Energy Society General Meeting, 2011 IEEE, (Jul. 2011) pp. 1-7.
International Search Report from International Application No. PCT/US2020/070616, dated Jan. 25, 2021, 5 pages.
International Written Opinion from International Application No. PCT/US2020/070616, dated Jan. 25, 2021, 9 pages.

* cited by examiner

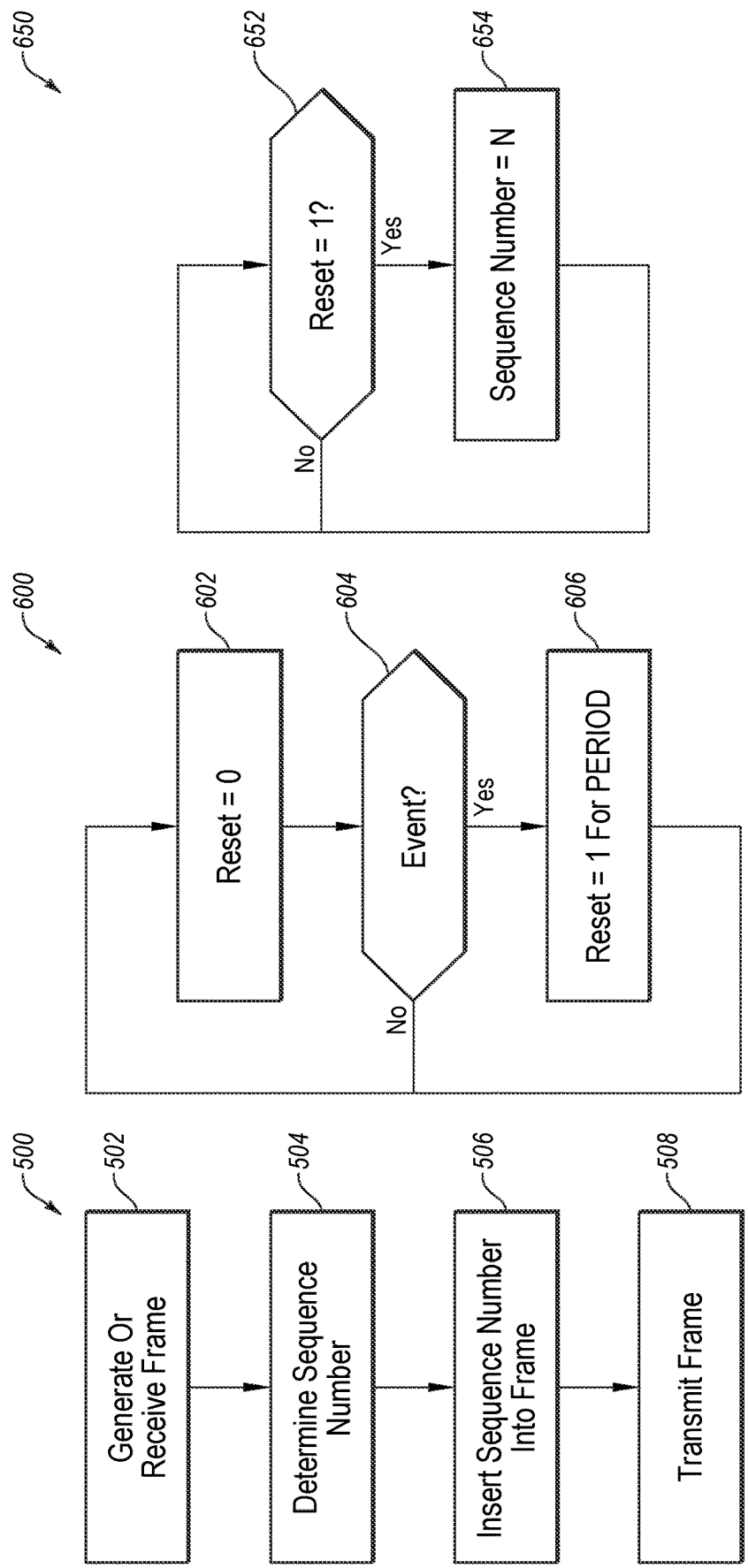

SYNCHRONIZATION OF SEQUENCE NUMBERS IN A NETWORK

CROSS-REFERENCE TO RELATED APPLICATION

This application is a continuation of U.S. patent application Ser. No. 16/948,908, filed Oct. 5, 2020, now U.S. Pat. No. 11,108,860, issued Aug. 31, 2021, which claims the benefit of the priority date of U.S. Provisional Patent Application No. 62/982,654, filed Feb. 27, 2020, and titled "SYNCHRONIZATION OF SEQUENCE NUMBERS," the disclosure and contents of each of which is incorporated herein in its entirety by this reference.

TECHNICAL FIELD

The present disclosure relates, generally, to communication networks, and more specifically to generating sequence numbers in a communication network. Yet more specifically, various embodiments of the disclosure relate to synchronizing sequence numbers at a number of devices of a communication network.

BACKGROUND

Various interface standards for connecting computers and external peripherals may be used to provide connectivity at high speeds. A widely used, flexible networking standard for connecting computers (e.g., in Local Area Networks (LANs) and Wide Area Networks (WANs)) is the Ethernet protocol. Ethernet communication generally refers to point-to-point communication within a network of multiple end points. Ethernet generally makes efficient use of shared resources, is easy to maintain and reconfigure, and is compatible across many systems.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

FIG. 5 is a flowchart of an example method of operating a node element, according to various embodiments of the present disclosure;

FIG. 6A is a flowchart of an example method of triggering a sequence number reset, in accordance with various embodiments of the present disclosure;

FIG. 6B is a flowchart of an example method of resetting a sequence number in response to a reset event, in accordance with various embodiments of the present disclosure;

DETAILED DESCRIPTION

Figure 1:
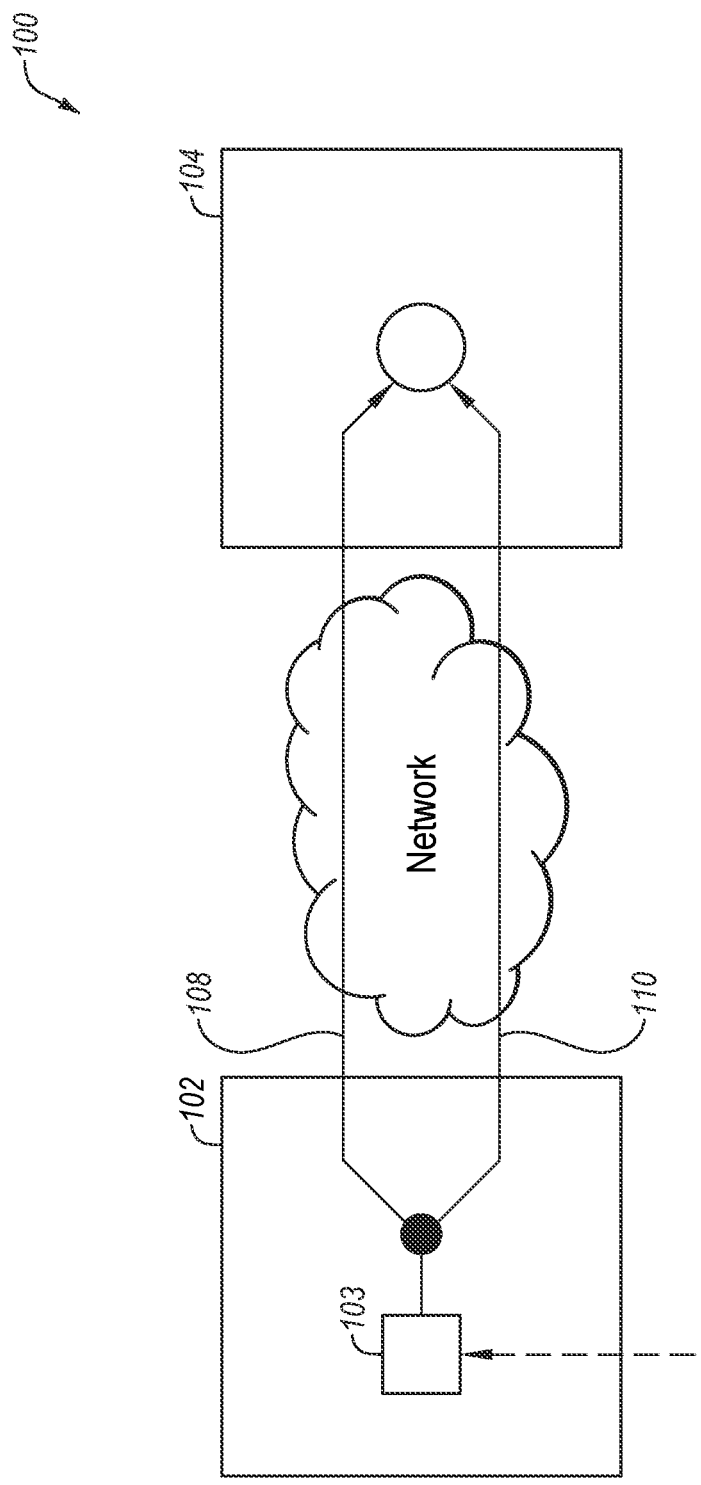
FIG. 1 depicts a network including two devices.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a processor such as a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform one or more of the features or functions of embodiments described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Automation/control systems (e.g., industrial control systems) are employed for controlling operation of, for example, processes and/or machines, and are typically adaptable to different control applications through configuration and interconnection of multiple control system components or devices (e.g., control modules, input/output (I/O) modules, I/O devices, without limitation). Some control systems may include a processor running or executing a control program to interact with an I/O system (e.g., typically one or more I/O modules or devices) to receive system information in the form of analog and/or digital inputs from field sensors and to provide outputs (analog and/or digital) to one or more actuators. Control systems may be interconnected with management information and other systems in a manufacturing facility, and may be operatively connected to any number of communications networks to facilitate various management functions (e.g., inventory control, accounting, manufacturing control, without limitation) in addition to process/machine control functionality.

A desire to integrate business and control network structures to interconnect control systems with general purpose systems, along with the evolution and development of Ethernet (e.g., in switch mode with full duplex capability), has allowed for Ethernet networks (e.g., such as Ethernet/Internet Protocol networks that allow for direct connection of field devices to an Ethernet network) to be widely used in various applications (e.g., industrial applications).

Time-Sensitive Networking (TSN) is a set of standards developed or under development by the Time-Sensitive Networking task group of the IEEE 802.1 working group. TSN standards aim to improve network delay properties, robustness, reliability, redundancy, and failure detection ability of Ethernet so that Ethernet may be used for real-time control and safety-critical applications. IEEE 802.1CB ("Frame Replication and Elimination for Reliability") and IEC 62439-3 ("High-availability Seamless Redundancy" (HSR) and "Parallel Redundancy Protocol" (PRP)) standards introduce redundancy and failure mitigation, which is important for certain control applications by using frame replication and duplicate elimination.

Increasing the availability of a network function may be achieved by, for example, using redundant implementations of the network function. For example, in cases of network redundancy (e.g., using redundant grand masters in accordance with IEEE 1588 or IEEE 802.1AS), two functional entities are part of a network and are capable of performing identical functions, but with distinct network identities. In this example, a timing slave may be locked to a grand master and upon failure of the grand master or of path unavailability to the grand master, the timing slave may select to become a slave of another grand master. In this case, frames (e.g., SYNC frames or so called "Announce" frames, without limitation) are sent by the grand masters with sequence numbers particular to each network identity.

FIG. 1 depicts a network 100 including a device 102 coupled to a device 104. Device 102 may be configured to convey a frame 103 to device 104 via redundant communication paths of a network. More specifically, at device 102, a sequence number may be inserted into frame 103, and frame 103 may be conveyed to device 104 via a first path 108 and a second path 110. In the event device 104 receives both copies of frame 103, one copy of frame 103 (e.g., the copy received second in time) may be discarded by device 104.

In some networks (e.g., high-availability automation networks, such as in process industries (e.g., at a chemical plant)), equipment redundancy may be required. In cases of equipment redundancy, one functional entity placed in a network has two or more redundant equipment instances. Redundant equipment instances can be physically co-located or be physically separated with a network between them. An example is the use of Virtual Router Redundancy Protocol (VRRP, IETF RFC 3768) that makes two routers appear as one to a host.

Equipment redundancy can be implemented using 1:1/1+1, and generally N:M/N+M schemes, where N:M indicates that N entities are in standby and M entities are active, and N+M indicates that all entities are active with an overcapacity of N. The case of 1:1 typically uses an active/standby scheme, where one equipment is active and the other is passive (e.g., not generating frames), whereas 1+1 uses an active/active scheme with both equipment entities active (e.g., both generating frames). In both cases, if operation is to be maintained seamlessly upon an equipment failure, and a function is to generate frames including sequence numbers, the sequence number generators at the redundant equipment entities must be coordinated. An example hereof, is generation of synchronization (SYNC) frames, where an active equipment entity generates sequence number p, and the next SYNC frame is generated from a redundant equipment entity with sequence number p+1. Another example includes generation of redundant frames for network redundancy, such as in accordance with IEEE 802.1CB, IEC 62439-3 PRP and HSR, and IEC 61458-6 MRPD, where one equipment entity generates one frame and the other entity generates a redundant frame, both having the same sequence number.

Figure 2:
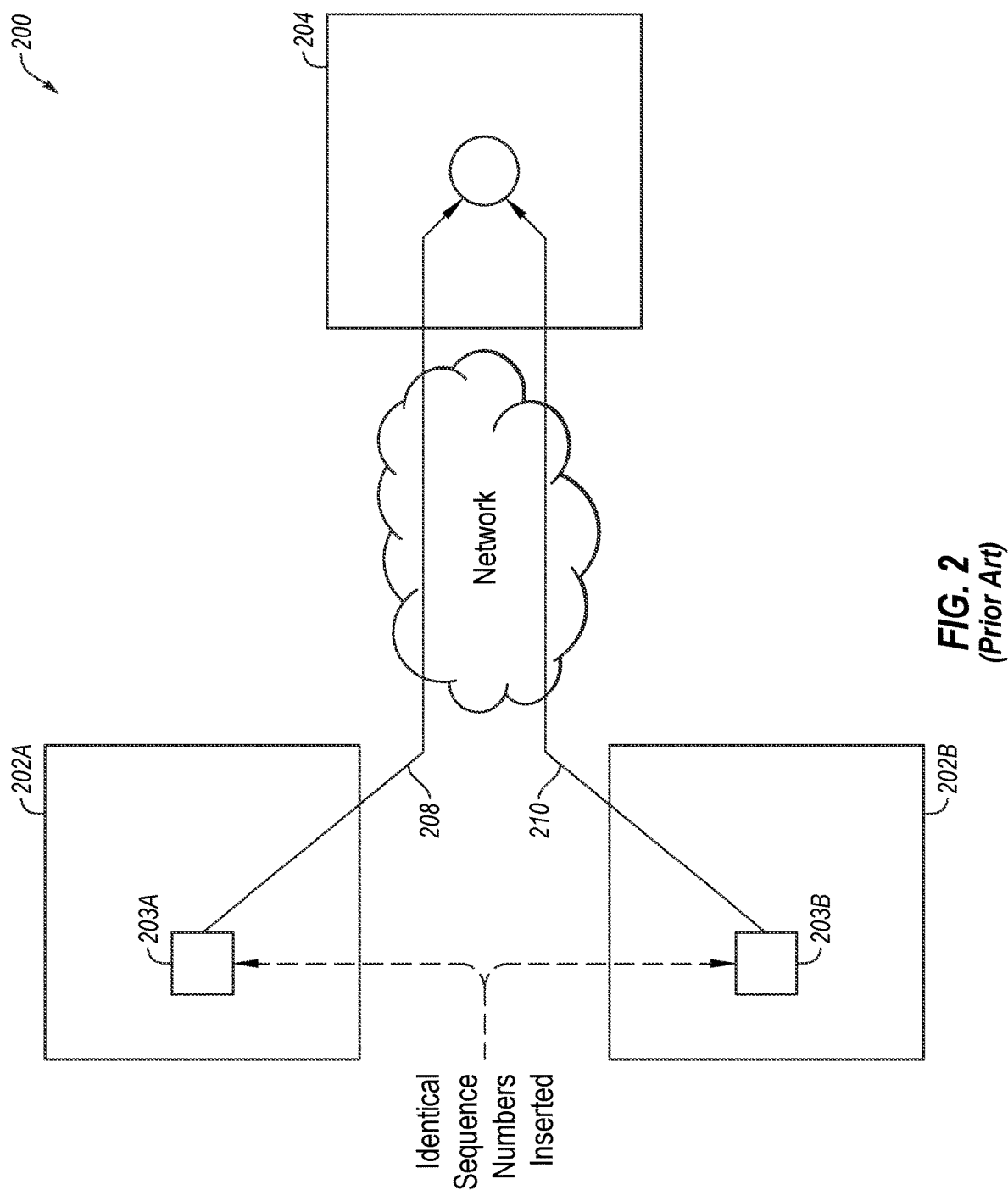
FIG. 2 depicts a network including a number of devices.

FIG. 2 illustrates a network 200 including devices 202A and 202B, and a device 204. In this example, device 202A (e.g., a first equipment) may be configured to convey a frame 203A to device 204 via a path 208 over a network, and device 202B (e.g., a second equipment) may be configured to convey a frame 203B to device 204 via a path 210 over the network. Further, at each of device 202A and 202B, a sequence number may be inserted into an associated frame before the frame is conveyed to device 204. Frame 203A conveyed from device 202A to device 204 is identical to or slightly different from frame 203B conveyed from device 202B to device 204. For example, frames 203A and 203B conveyed to device 204 may have different Ethernet headers (e.g., for reasons of forwarding through a network), however, configuration frames 203A and 203B are considered "identical" by device 204. Further, the sequence number inserted into the frame at device 202A is identical to the sequence number inserted into the frame at device 202B. In the event device 204 receives both frame 203A and frame 203B, either frame 203A or frame 203B (e.g., the copy of the frame received second in time) may be discarded by device 204.

Sequence numbers, which have monotonic increasing values, may be used for various purposes, such as indicating a current number of acknowledged bytes (e.g., in accordance with TCP, IETF RFC 793 protocol) or the count of an event (e.g., a number of transmitted SYNC frames (e.g., in accordance with IEEE 1588)).

A technical problem appreciated by the inventor of this disclosure is how to generate identical sequence numbers in multiple frames from redundant equipment entities such that an end system will be unaware that the frames did not originate in the same equipment entity, and that the end system may perform a proper function (e.g., IEEE 802.1CB frame elimination) upon receipt of a number of frames.

Generating identical sequence numbers in a number of devices (i.e., two equipment entities) is possible when the sequence number is derived from the time-of-day (TOD) at which the event occurs, assuming each of the number of devices are TOD synchronized. In event-based systems (i.e., that use event-based sequence numbers), sequence numbers may be continuous (whereas TOD systems may skip sequence numbers) making it possible to count a number of packets sent. Further, event-based systems may not require TOD formats and as a result may avoid time-based problems (e.g., leap-second adjustments).

Various embodiments, as described more fully below, relate to synchronization of sequence numbers in networks. More specifically, various embodiments relate to synchronization of sequence numbers to be used in networks including equipment redundancy (e.g., networks employing network redundancy protocols). As will be appreciated, various embodiments of the present disclosure may be implemented in event-based systems and/or networks (e.g., wherein a sequence number may represent an event count). For example, various embodiments may improve operation of a network (e.g., network 200 of FIG. 2).

Figure 4A:
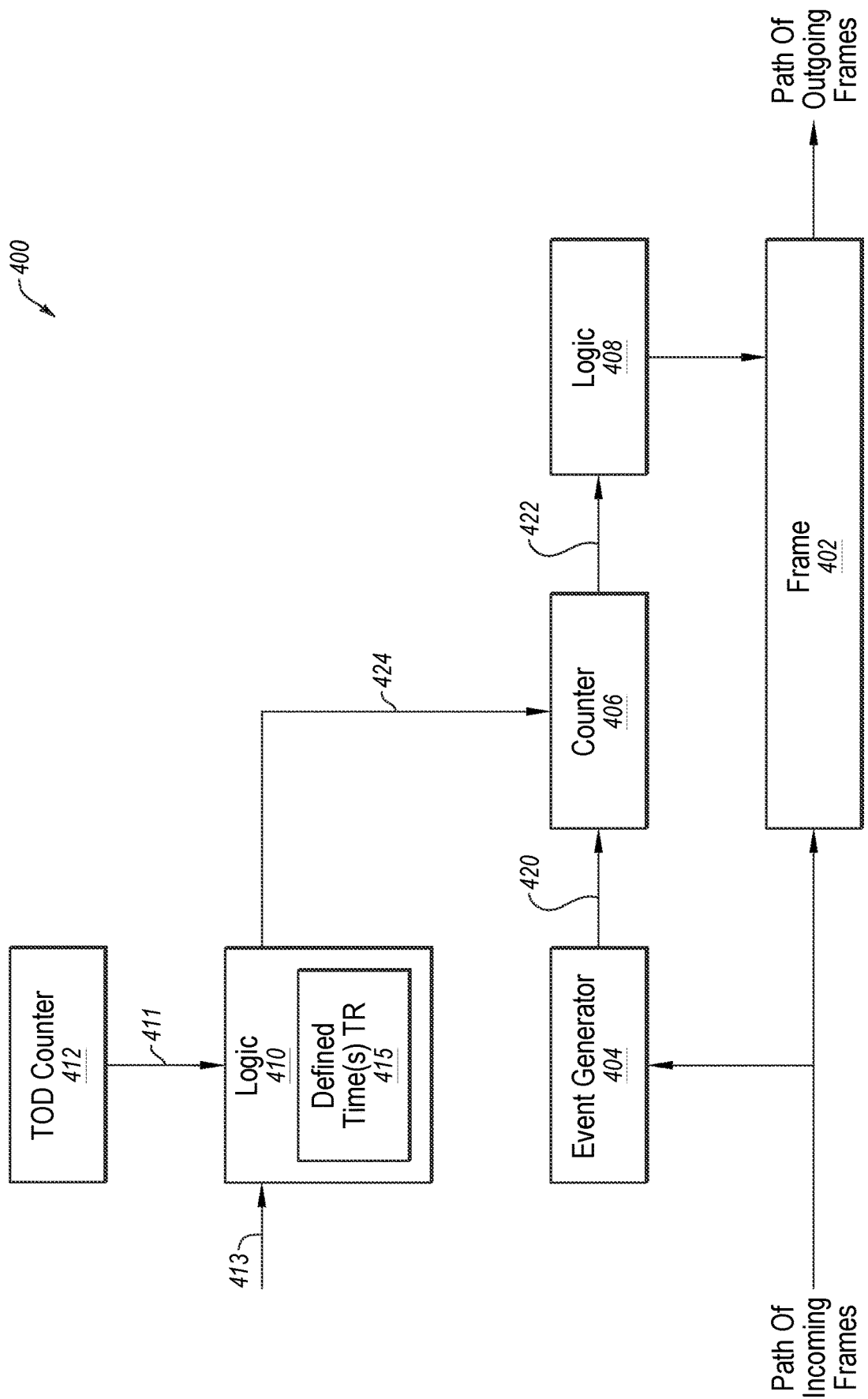
FIG. 4A depicts a node element portion, in accordance with various embodiments of the present disclosure.

In some embodiments, coordination of event counting sequence number generation in two or more equipment (i.e., two or more devices) may be done via, for example, configuring one or more defined times (e.g., defined time(s) TR; see FIG. 4A) at which a sequence number generator (e.g., a counter, without limitation) at each equipment is reset (e.g., to an integer value N). In at these embodiments, since the number of frames generated by each equipment is substantially identical, the sequence number at each equipment may advance identically.

In some embodiments, a number of defined times that each equipment is reset may be specified (e.g., set or programmed, without limitation) via a management system, or specified by a master-slave protocol in which a device with the highest or lowest identifier takes on a master role and distributes the number of defined times. Protocols other than master-slave protocols do not exceed the scope of this disclosure.

Figure 3:
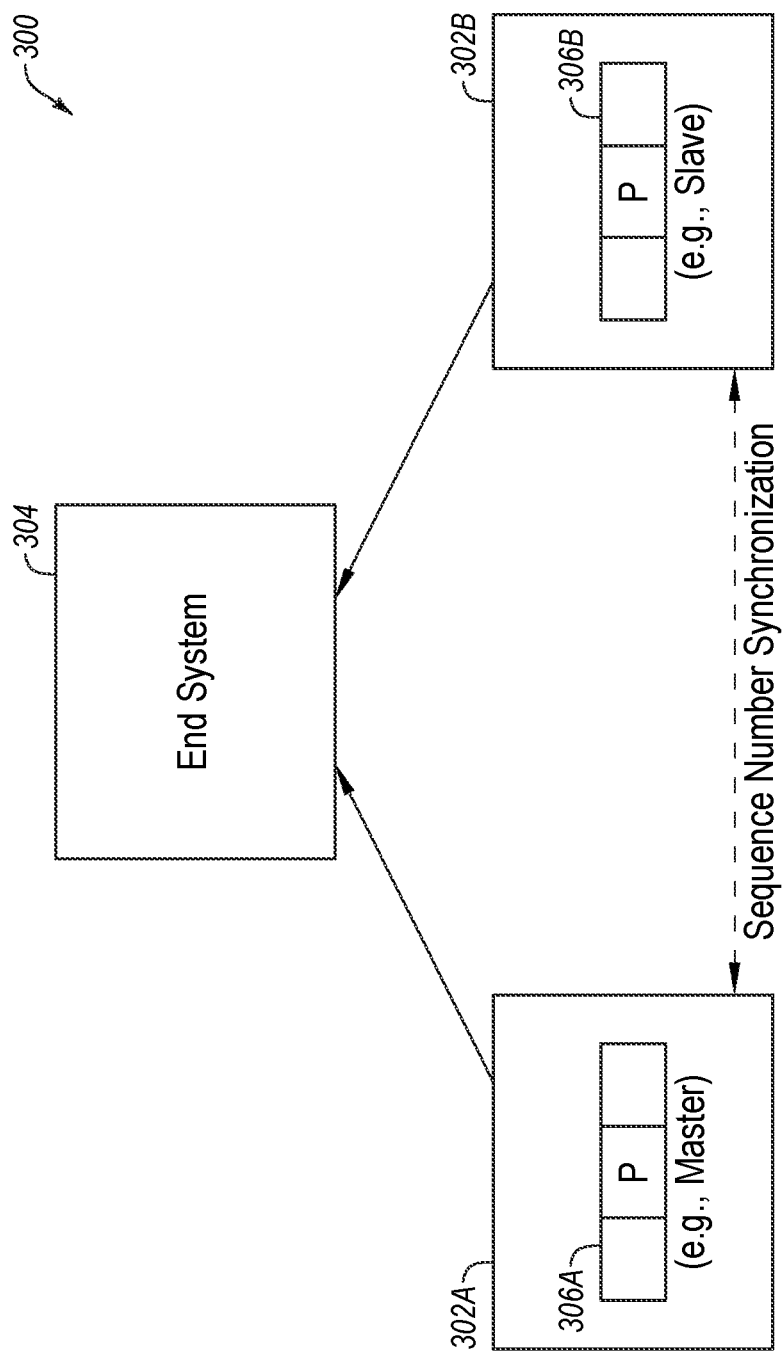
FIG. 3 is another illustration of a network including a number of devices, according to various embodiments of the present disclosure.

FIG. 3 depicts a system (also referred to herein as a "network") 300 including a device (also referred to herein as "equipment," "entity," or "equipment entity") 302A, a device (also referred to herein as "equipment," "entity," or "equipment entity") 302B, a device (also referred to herein as "end system" or "end device") 304, a frame 306A, and a frame 306B. It will appreciated that, in some examples, one of device 302A and 302B may be referred to as, for example, an "equipment" or a "device" and the other of device 302A and 302B may be referred to as, for example, a "redundant equipment," a "redundant equipment instance," or a "redundant device." Further, device 302A and device 302B may collectively be referred to herein as "redundant entities" or "redundant instances." For example, each of device 302A and device 302B may include a node element portion 400 illustrated in FIG. 4A.

According to some embodiments, device 302A is configured to generate frame 306A, and device 302B is configured to generate frame 306B, which is the same or similar to frame 306A. In other words, frames 306A and 306B may be the same or slightly different. For example, frames 306A and 306B may have different Ethernet headers (e.g., for reasons of forwarding through a network), however, frames 306A and 306B by configuration may be considered "identical" by device 304. For example, each of device 302A and device 302B may be similarly configured and receive the same or similar inputs so as to generate the same or similar frames, as will be appreciated by a person having ordinary skill in the art.

According to various embodiments, devices 302A and 302B may be configured to generate identical sequence numbers (e.g., substantially simultaneously). In other words, sequence numbers generated by devices 302A and 302B may be synchronized. More specifically, according to some embodiments, each of device 302A and device 302B may respectively include a sequence counter (not shown in FIG. 3; e.g., sequence counter 406 of FIG. 4A, without limitation) configured to increment and output a sequence number ("count value"). Further, as described more fully below, each of device 302A and device 302B may be configured to insert their respectively generated sequence number into an associated frame. More specifically, device 302A may be configured to insert a sequence number into frame 306A and device 302B may be configured to insert a sequence number into frame 306B. As illustrated in FIG. 3, frames 306A and 306B have the same sequence number (i.e., Seq. No.=P).

Moreover, each of device 302A and device 302B may be configured to transmit an associated frame to device 304 (e.g., via a bus) including respective inserted sequence numbers. In some embodiments, device 302A and 302B are TOD synchronized, and thus device 302A and device 302B may be configured to transmit an associated frame at about the same time. As described more fully below, to coordinate a sequence counter at device 302A and a sequence counter at device 302B, the respective sequence counters may be reset responsive to an event (e.g., a reset event, such as a power cycle, a timing event (e.g., a periodic reset), and/or one or more other defined times for a reset).

Figure 4B:
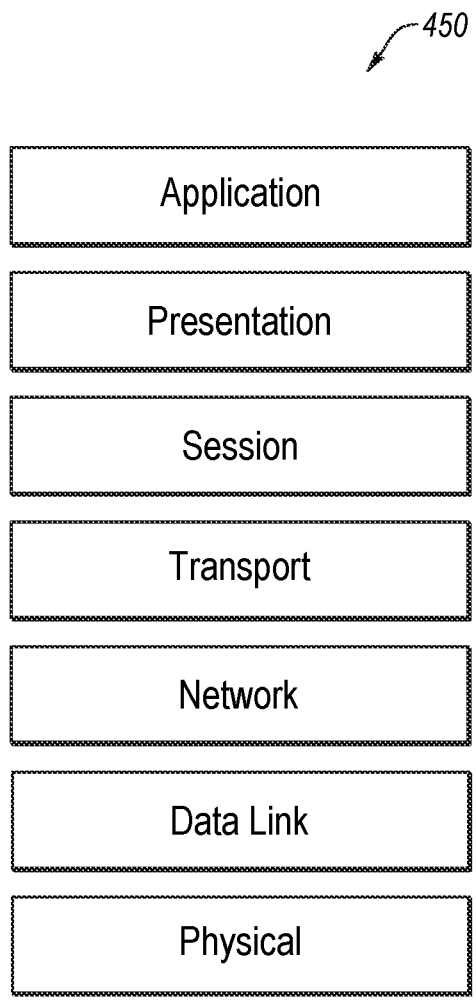
FIG. 4B depicts an OSI model including a number of layers.

FIG. 4A illustrates node element portion 400, in accordance with various embodiments for the present disclosure. For example, each of device 302A and device 302B of FIG. 3 may include respective instances of node element portion 400. FIG. 4B illustrates an Open Systems Interconnection (OSI) model 450 including a number of layers, including an application layer, a presentation layer, a session layer, a transport layer, a network layer, a data link layer, and a physical layer. As will be appreciated, an OSI model is a conceptual framework that describes the functions of a networking or telecommunication system.

With reference to FIG. 4A, node element portion 400, which may include or be included in, as non-limiting examples, a physical layer (PHY) element and/or a media access control (MAC) element, may be configured to receive or generate a frame 402 (e.g., at a certain time and/or in response to an event). More specifically, as will be appreciated, frame 402 (also referred to herein as a "data frame") may include data (e.g., data from data storage and/or input data) and may be generated via, for example, one or more processors. For example, frame 402 may be generated in whole or in part in a PHY layer or a data link layer by a PHY element or MAC element of a node. Generation of frame 402, in whole or in part, in layers other than the physical and data link layers, in multiple layers, between what are typically understood to be network layers (e.g., an interface sub-layer, without limitation), or outside of an OSI model type network stack does not exceed the scope of this disclosure.

Node element portion 400 may further include an event generator 404, a sequence counter 406 (depicted as "counter 406" by FIG. 4A), logic 408, logic 410, and TOD counter 412. Event generator 404 may be configured to generate a pulse (e.g., event signal 420) in response to a frame event (i.e., in response to receipt of and/or generation of frame 402 (i.e., at node element portion 400)). Further, as will be appreciated, sequence counter 406 may increment a stored count value (e.g., by one) for each event signal 420 received from event generator 404. Further, sequence counter 406 may (e.g., in response to a received event signal 420) convey the count value (i.e., via signal 422) to logic 408 (also referred to herein as "count insertion logic"), which may be configured to insert the count value as a sequence number into an available portion (e.g., bits or bytes) of frame 402. For example, the count value, which may be indicative of a current number of frame events (e.g., a number of frames generated and/or received at node element portion 400 since the last reset/initialization) may be inserted into frame 402 (e.g., as frame 402 passes an associated stage of a processing pipeline) as a sequence number. Further, logic 408 may be configured to insert a sequence number into frame 402 at a defined offset (e.g., from the start of frame 402).

In some non-limiting embodiments, sequence counter 406 may operate logically at one or more layers of OSI model 450 (see FIG. 4B), such as at the data link layer (i.e., layer 2), at the network layer (i.e., layer 3), and/or one or more other layers of OSI model 450.

TOD counter 412, which may be synchronized (e.g., according to IEEE 1588 (Precision Time Protocol)) with a network master clock (not shown), may convey a TOD count 411 to logic 410. For example, TOD counter 412 may include a counter (e.g., a nanosecond counter) configured to output a pulse (i.e., TOD count 411) every specified number of nanoseconds (e.g., 1, 2, 10, 100, without limitation). Logic 410, which may include and/or may access a number of predefined times, each denoted as a predefined time TR (e.g., 23 h:59 m:59 s, 11 h:59 m:59 s, 07 hr:59 m:59 s, without limitation), may be configured to compare TOD count 411 to each of the predefined times TR. More specifically, for example, logic 410 may include compare logic configured to compare TOD count 411 to one or more predefined times TR 415 (e.g., predefined times TR may be within a database). Further, in response to TOD count 411 matching any of the predefined times TR 415, logic 410 may transmit a reset signal 424 (e.g., a pulse) to sequence counter 406, and responsive to the reset signal 424, sequence counter 406 may reset to an initial predetermined count value.

Logic 410 may be configured to transmit reset signal 424 to sequence counter 406, additionally or alternatively to TOD count 411 matching any of the defined times TR, in response to a received signal 413 indicative of a power reset (e.g., indicative of a power cycle of an associated network, whether or not a power cycle actually occurred or occurs). As will be further appreciated, sequence counter 406 may be reset by setting all bits (i.e., all outputs of one or more flip-flops) of sequence counter 406 to specific value (e.g., zero or another initial predetermined count value).

Notably, one or more elements of node element portion 400 may be implemented in the same or different communication layers (e.g., according to the OSI model 450, without limitation). As a non-limiting example, event generator 404, sequence counter 406, TOD counter 412, and logic 410 may be implemented in a data link layer (e.g., in a MAC element, without limitation) and logic 408 may be implemented in the data link layer or a physical layer (e.g., in a PHY element, without limitation). Other arrangements among various layers do not exceed the scope of this disclosure.

FIG. 5 is a flowchart of an example method 500 of operating a node element (e.g., node element portion 400 of FIG. 4A) (e.g., of a single equipment, such as device 302A of FIG. 3). At block 502, a frame is generated (e.g., at the device), and method 500 may proceed to block 504. At block 504, a sequence number is determined (e.g., at the device via a sequence counter, such as sequence counter 406 of FIG. 4A), and method 500 may proceed to block 506. For example, in response to generation of the frame, at block 504 the sequence number may be incremented by one (i.e., the sequence number may be equal to a previous sequence number+1 (e.g., sequence number=sequence number+1)), and the sequence number may be output from the sequence counter. At block 506, the sequence number may be inserted into the frame (e.g., via logic 408 of FIG. 4A), and method 500 may proceed to block 508. At block 508, the frame may be transmitted (e.g., from the device to another device (e.g., end system 304) via a bus).

According to some embodiments, a sequence number generator may be initialized or a sequence number may be reset by resetting a sequence counter (e.g., sequence counter 406 of FIG. 4A) in response to a reset event (e.g., a timing event). For example, FIG. 6A depicts a flowchart of an example method 600 of triggering a sequence number reset, in accordance with various embodiments of the disclosure. At block 602, a variable RESET (e.g., reset signal 424 of FIG. 4A) may be equal to a first value (e.g., zero (i.e., RESET=0), i.e., variable RESET is LOW, or UNASSERTED), and method 600 may proceed to block 604.

At block 604, it may be determined whether or not a reset event (e.g., a timing event) has occurred. If a reset event has occurred, method 600 may proceed to block 606. If a reset event has not occurred, method 600 may return to block 602.

At block 606, variable RESET is set equal to a second value (e.g., one (i.e., RESET=1), i.e., variable RESET is HIGH, or ASSERTED) for a time duration PERIOD, and method may return to block 602. For example, time duration PERIOD is a sufficient time duration such that a count value of the sequence counter (sequence counter 406 of FIG. 4A) may be reset to integer N (e.g., N=0 or another initial predetermined count value). It is noted that the acts of method 600 may be performed in a number of network devices (e.g., device 302A and device 302B of FIG. 3) (e.g., substantially simultaneously).

FIG. 6B is a flowchart of an example method 650 of initializing a sequence number generator or resetting a sequence number in response to a reset, in accordance with various embodiments of the disclosure. It is noted that the acts of method 650 may be performed in a number of network devices (e.g., device 302A and device 302B of FIG. 3) (e.g., substantially simultaneously).

At block 652, it may be determined whether or not a variable RESET is HIGH (i.e., is RESET=1?). For example, it may be determined whether or not an output of logic 410 (e.g., reset signal 424—see FIG. 4A) conveyed to sequence counter 406 is HIGH. If it is determined that variable RESET is HIGH, method 650 may proceed to block 654, where a sequence number (e.g., of sequence counter 406) may be set equal to integer N (e.g., N=0 or another initial predetermined count value). If it is determined that variable RESET is LOW, method 650 may return to block 652.

Figure 7:
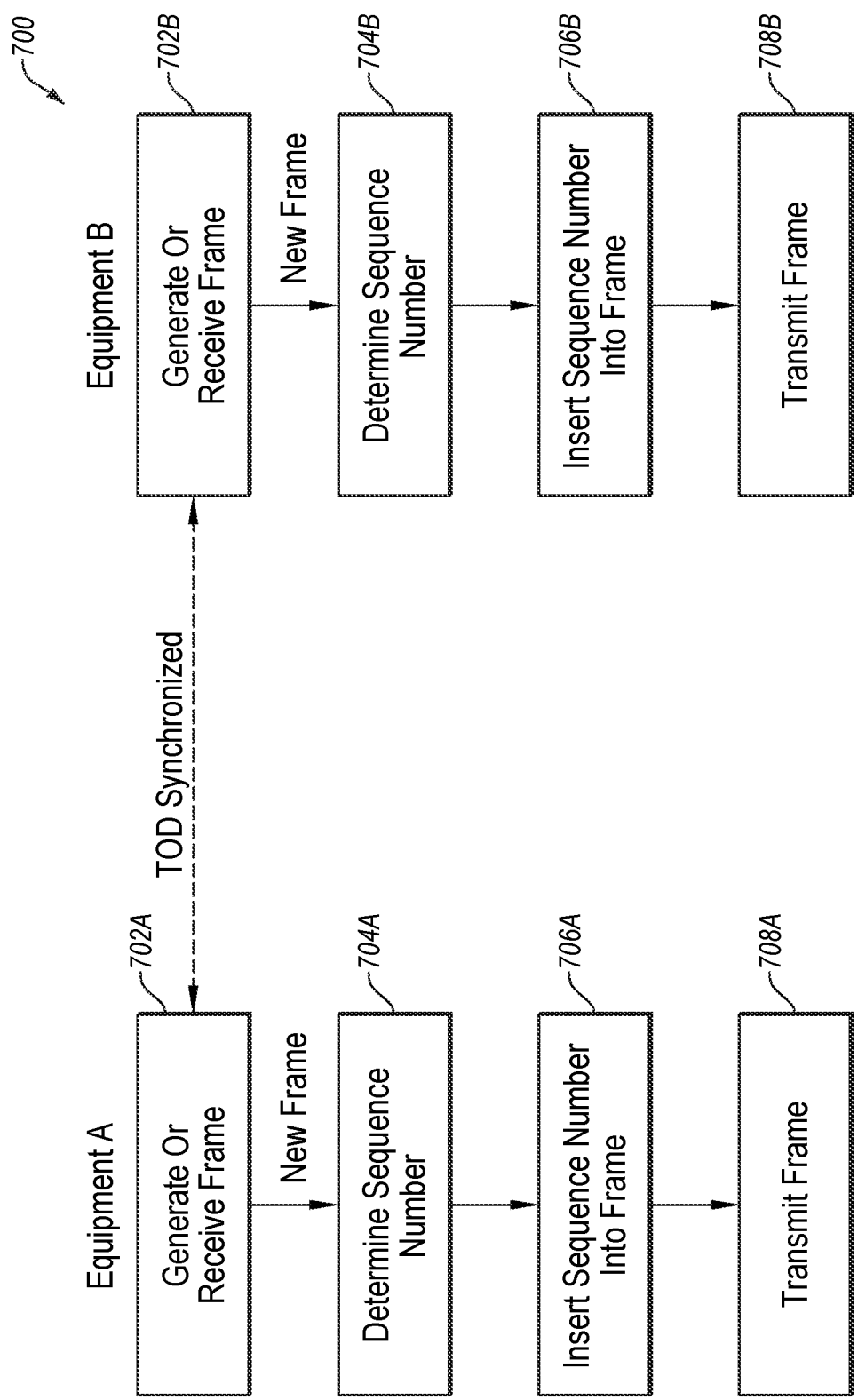
FIG. 7 is a flowchart of an example method of operating a node element at each of a number of devices of a network, according to various embodiments of the present disclosure.

FIG. 7 is a flowchart of an example method 700 of operating a node element at each of a number of devices (i.e., two equipment entities, such as device 302A and device 302B of FIG. 3) of a network, in accordance with various embodiments of the disclosure. At least a portion of method 700 may be performed, in some embodiments, by a device or system, such as system 300 of FIG. 3, node element portion 400 of FIG. 4A, or another device or system. Although illustrated as discrete blocks, various blocks may be divided into additional blocks, combined into fewer blocks, or eliminated, depending on the desired implementation.

At each of blocks 702A and 702B, a frame is generated or received, and method 700 may proceed to blocks 704A and 704B. More specifically, for example, at block 702A, a frame (e.g., a first instance of frame 402) is generated at a first device (e.g., at device 302A of FIG. 3), and at block 702B, a frame (e.g., a second instance of frame 402) is generated at a second device (e.g., at device 302B of FIG. 3). For example, the frames 402 generated at blocks 702A and 702B may be the same, or similar, and, in at least these embodiments, the frames generated at blocks 702A and 702B may be considered "identical" by (e.g., by a receiving device). Further, according to some embodiments, the first device and the second device are TOD synchronized and the frames generated/received at blocks 702A and 702B may be generated/received at approximately the same time. For example, each frame may be generated via a different node element (e.g., node element portion 400 of FIG. 4A) that are similarly configured and synchronized.

At each of blocks 704A and 704B, a sequence number is determined, and method 700 may proceed to blocks 706A and 706B. For example, in response to generation of the frame, the sequence number may be incremented by one (i.e., the sequence number may be equal to a previous sequence number+1 (e.g., sequence number=sequence number+1)), and the sequence number may be output from a sequence counter (e.g., sequence counter 406 of FIG. 4A). For example, the sequence number may be a count value of the sequence counter of a node element (e.g., node element portion 400 of FIG. 4A). According to various embodiments disclosed herein, the sequence numbers determined at blocks 704A and 704B are identical.

At each of blocks 706A and 706B, the determined sequence number may be inserted into the frame (i.e., the frame generated at associated blocks 702A and 702B), and method 700 may proceed to blocks 708A and 708B. For example, at block 706A, the sequence number determined at block 704A may be inserted into the frame at the first device (e.g., device 302A of FIG. 3), and at block 706B, the sequence number determined at block 704B may be inserted in the frame at the second device (e.g., device 302B of FIG. 3). For example, the determined sequence number may be inserted into the frame (e.g., frame 402 of FIG. 4) via logic (e.g., logic 408 of FIG. 4).

At each of blocks 708A and 708B, the frames including respective synchronized sequence numbers may be transmitted. For example, at block 708A, the frame generated at the first device (e.g., device 302A of FIG. 3) may be transmitted via the first device onto a bus (e.g., to an end system (e.g., device 304 of FIG. 3)), and the frame generated at the second device (e.g., device 302B of FIG. 3) may be transmitted via the second device onto a bus (e.g., to an end system (e.g., device 304 of FIG. 3)).

Modifications, additions, or omissions may be made to method 700 without departing from the scope of the present disclosure. For example, the operations of method 700 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 8:
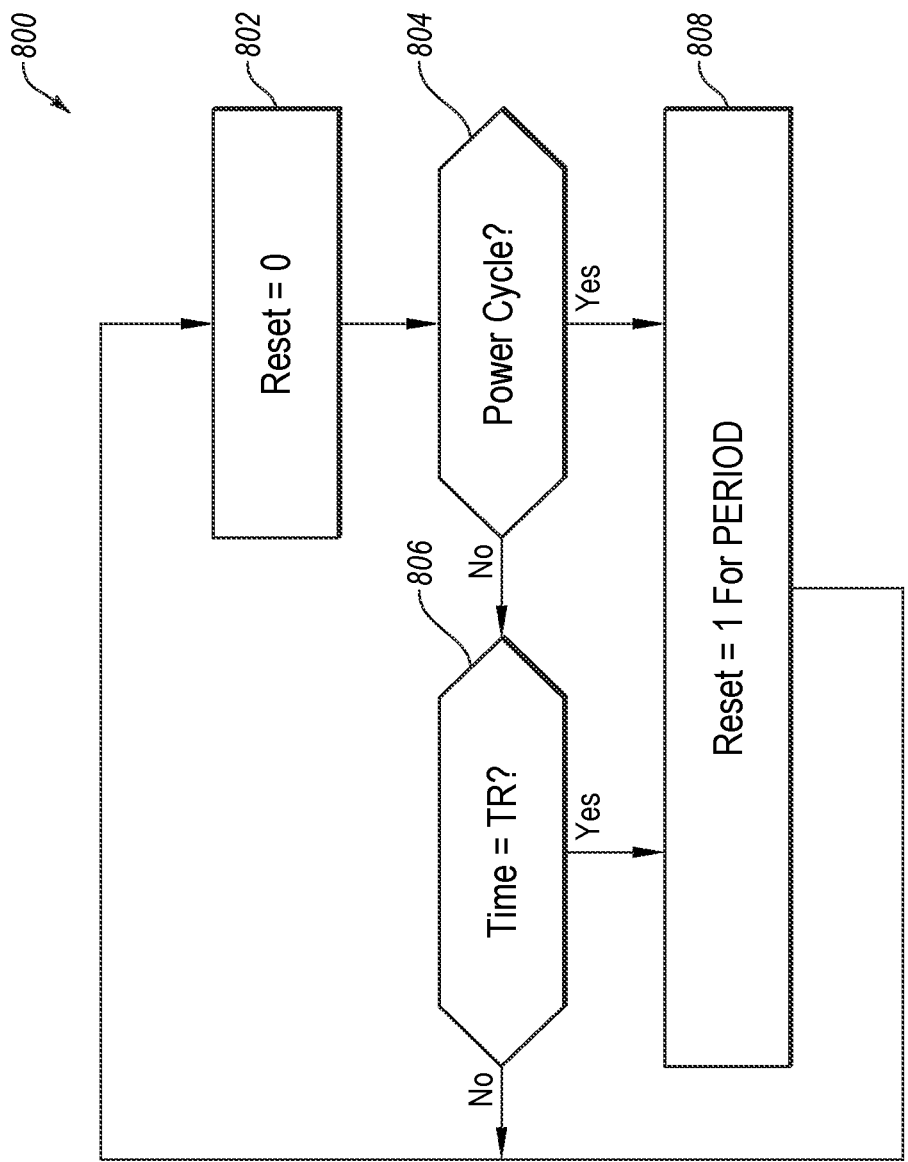
FIG. 8 is a flowchart of another example method of triggering a sequence number reset, in accordance with various embodiments of the present disclosure.

In some embodiments, a sequence number may be reset (i.e., to an integer) at a number (e.g., two or more) of devices in response to an event (e.g., a timing event and/or a power reset event). More specifically, according to some embodiments, in response to a timing event wherein a current network time (e.g., indicative of a time of day) is equal to a predefined time (e.g., a programmed time), a sequence number of a number of devices (e.g., two or more devices) of a network may be reset (i.e., to the initial predetermined count value, which is common among the number of devices). Further, according to some embodiments, in response to power reset (also referred to herein as a "power cycle") (e.g., of the network), a sequence number of a number of devices (e.g., two or more devices) of the network may be reset (i.e., to the initial predetermined common count value). For example, FIG. 8 is a flowchart of an example method 800 of triggering a sequence number reset, in accordance with various embodiments of the disclosure. It is noted that the acts of method 800 may be performed in a number of network devices (e.g., device 302A and device 302B of FIG. 3) (e.g., substantially simultaneously).

At block 802, a variable RESET may be equal to a first value (e.g., to a LOW or UNASSERTED value, RESET=0), and method 800 may proceed to block 804. For example, variable RESET may be an output of logic 410 of FIG. 4A provided to sequence counter 406 as reset signal 424.

At block 804, it may be determined whether or not a power cycle has occurred. For example, logic 410 of FIG. 410 may receive signal 413 indicative of whether or not a power cycle has occurred. For example, received signal 413 may be HIGH, or change from a first state to a second state, in response to a power cycle. If a power cycle has occurred, method 800 may proceed to block 808. If a power cycle has not occurred, method 800 may proceed to block 806.

At block 806, it may be determined whether or not a timing event has occurred. More specifically, it may be determined whether a current network time is equal to any of one or more pre-defined time (e.g., predefined times TR 415 shown in FIG. 4A). For example, logic 410 of FIG. 4A may be configured to receive TOD count 411 from TOD counter 412, compare TOD count 411 to one or more predefined times, and, based on the comparison, determine whether or not a timing event has occurred. If the current network time is equal to one of the predefined times, a timing event has occurred and method 800 may proceed to block 808. If the current network time is not equal to one of the predefined times (i.e., a timing event has not occurred), method 800 may return to block 802.

At block 808, variable RESET is set equal to a second value (e.g., to a HIGH or ASSERTED value, RESET=1) for a time duration PERIOD, and method 800 may return to block 802. For example, logic 410 of FIG. 4A may generate reset signal 424 as a pulse (e.g., a HIGH variable RESET), which may be received at sequence counter 406. Further, for example, in response to receipt of reset signal 424 from logic 410, sequence counter 406 may be reset by setting all bits (i.e., all outputs of one or more flip-flops of sequence counter 406) to an integer (e.g., N=0 or another initial predetermined count value). For example, time duration PERIOD is a sufficient time duration such that a count value of the sequence counter (sequence counter 406 of FIG. 4A) may be reset to integer N (e.g., N=0 or another initial predetermined count value).

Modifications, additions, or omissions may be made to method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, the operations at blocks 804 and 806 may be interchanged. As another example, the operation at block 804 may be omitted, and method 800 may proceed from block 802 to block 808.

For example, frames may be generated in a number M of devices of a network (e.g., some or all devices of the network) at a rate R starting at time Ts (e.g., frames are transmitted at TOD=Ts, Ts+1/R, Ts+2*1/R, and so on). A frame generation time, TG, for the jth device is TG, j. The maximum difference in generation time, Max (TG, j−TG, k), where j=1 . . . M, and k=1 . . . M, j≠k, is assumed to be much smaller than 1/R. If a reset occurs at reset time TR=Ts+N*1/R, i.e., at a frame generation time, a sequence number inserted to the frame may be undetermined. In some embodiments, to avoid simultaneous frame generation and sequence number reset operations, in at least some devices of a network, a reset may be postponed a fraction of 1/R after a frame generation time. More specifically, according to at least some embodiments, one or more defined times TR may be between frame generation times (e.g., TR=Ts+½*1/R+ N*1/R).

Figure 9A:
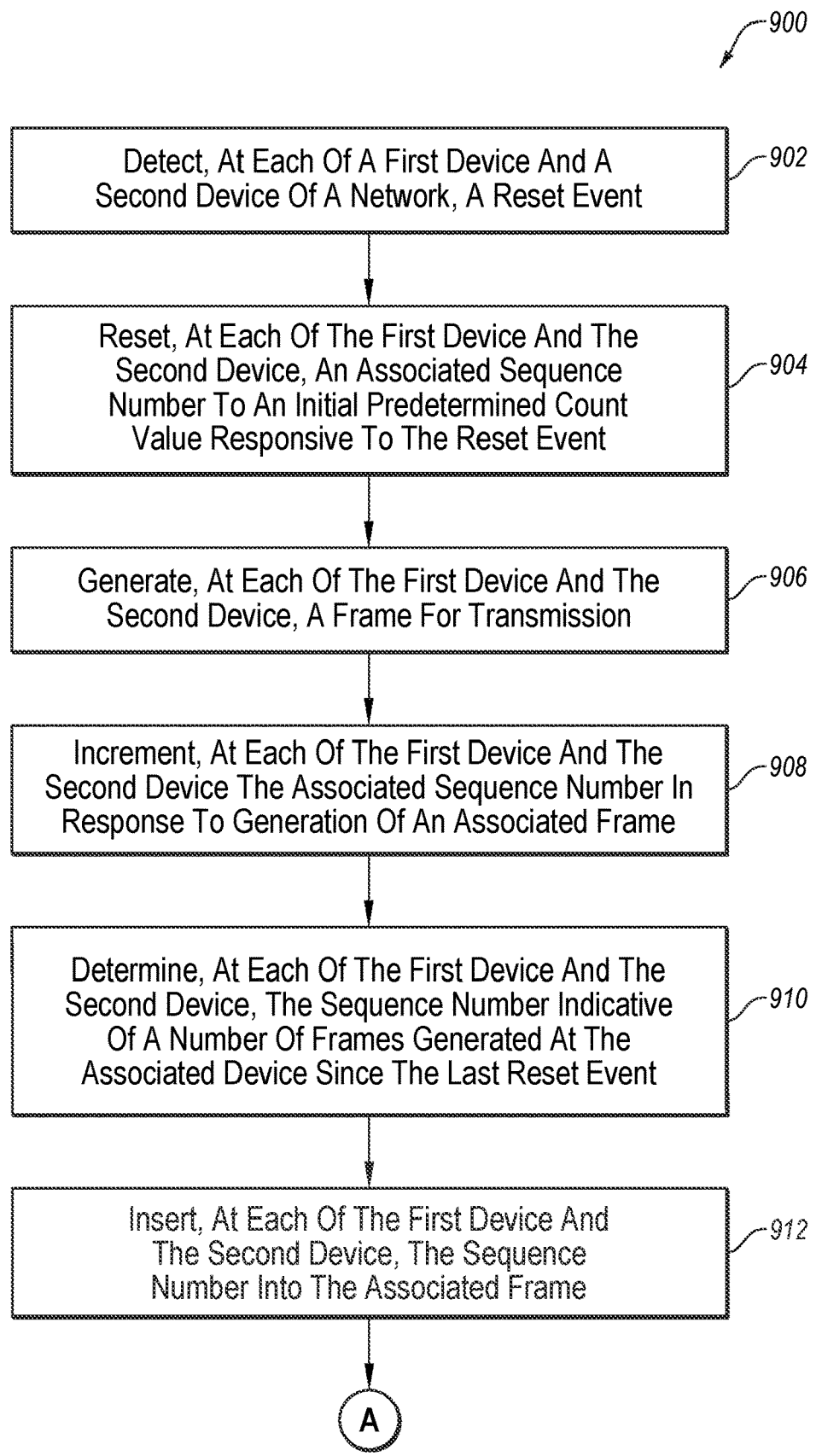
FIGS. 9A and 9B depict a flowchart of an example method of synchronizing sequence numbers at a number of devices of a network, according to various embodiments of the present disclosure.
Figure 9B:
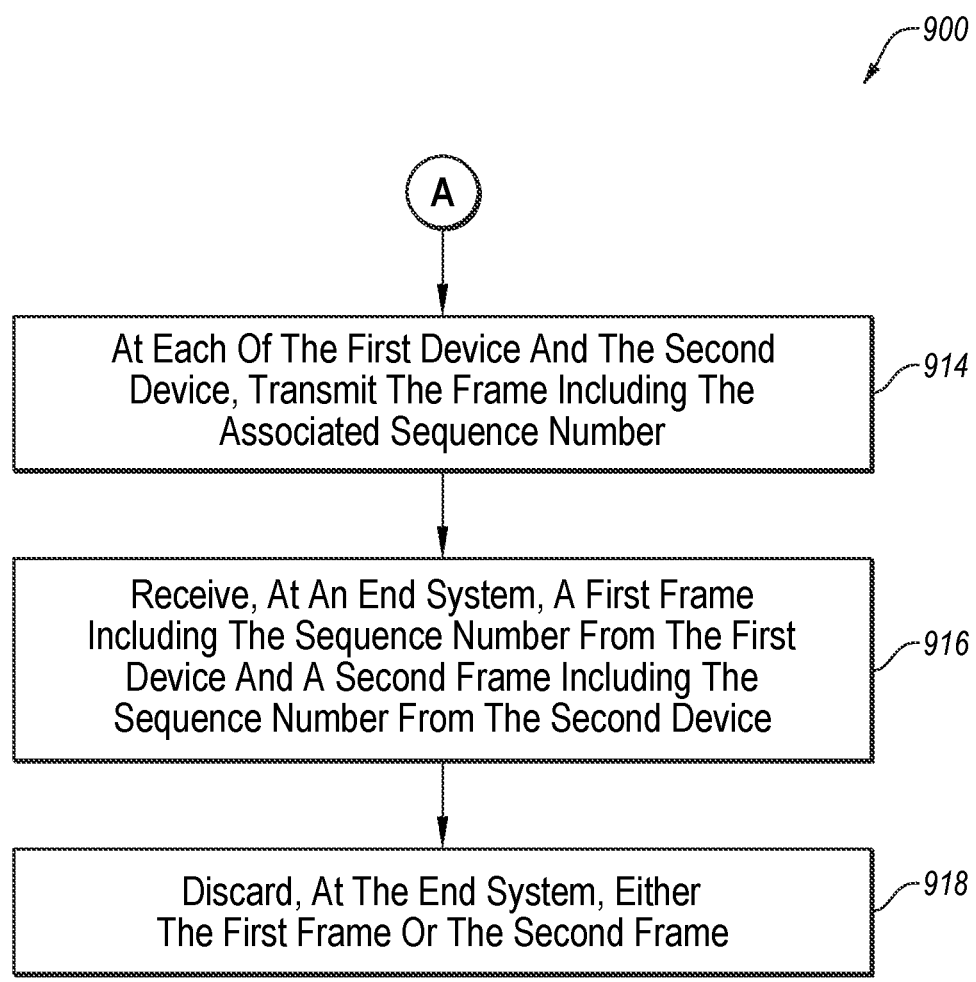

FIGS. 9A and 9B depict a flowchart of an example method 900 of synchronizing sequences numbers for a number of devices (i.e., two equipment entities, such as devices 302A and 302B of FIG. 3) of a network, in accordance with various embodiments of the disclosure. Method 900 may be arranged in accordance with at least one embodiment described in the present disclosure. At least a portion of method 900 may be performed, in some embodiments, by a device or system, such as system 300, node element portion 400, or another device or system. Although illustrated as discrete blocks, various blocks may be divided into additional blocks, combined into fewer blocks, or eliminated, depending on the desired implementation.

At block 902, a reset event may be detected at each of a first device and a second device of a network, and method 900 may proceed to block 904. For example, logic 410 of FIG. 4A may detect a timing event (e.g., upon receipt of TOD count 411 from TOD counter 412).

At block 904, at each of the first device and the second device, an associated sequence number may be reset to an initial predetermined count value, which initial predetermined count value is common among the first and second device, responsive to the reset event, and method 900 may proceed to block 906. For example, the sequence number may be reset to the integer (e.g., N=0 or another initial predetermined count value) responsive to a timing event (e.g., a current network time being equal to a defined time TR).

At block 906, at each of the first device and the second device, a frame for transmission may be generated, and method 900 may proceed to block 908. A frame generated via the first device may be substantially identical to a frame generated via the second device. For example, the frame (e.g., frame 402 of FIG. 4A) may be generated via a node element (e.g., node element portion 400 of FIG. 4A).

At block 908, at each of the first device and the second device, the associated sequence number may be incremented in response to generation of the associated frame, and method 900 may proceed to block 910. For example, a sequence number may be incremented via sequence counter 406 of FIG. 4A in response to receipt of an event signal 420 (e.g., a pulse) from event generator 404.

At block 910, at each of the first device and the second device, the associated sequence number, which may be indicative of a number of frames generated and/or received at the associated device since the reset event of block 904, may be determined, and method 900 may proceed to block 912. More specifically, the sequence number, which may be indicative of a number of frames generated and/or received at a node element (e.g., node element portion 400 of FIG. 4A) since the most recent reset or initialization event, may be determined via a counter (e.g., sequence counter 406 of FIG. 4).

At block 912, the associated sequence number may be inserted into an associated frame at each of the first device and the second device, and method 900 may proceed to block 914. For example, the sequence number may be inserted into an available portion of a frame (e.g., frame 402 of FIG. 4A) via logic (e.g., logic 408 of FIG. 4A).

At block 914, at each of the first device and the second device, the frame including a sequence number may be transmitted, and method 900 may proceed to block 916. For example, an associated frame may be transmitted from the first device and the second device to an end system (e.g., end system 304) (e.g., via a bus).

At block 916, a first frame including the sequence number and transmitted from the first device (e.g., device 302A of FIG. 3), and a second frame including the sequence number and transmitted from the second device (e.g., device 302B of FIG. 3), may be received at an end system (e.g., end system 304 of FIG. 3), and method 900 may proceed to block 918.

At block 918, at the end system, either the first frame or the second frame may be discarded. More specifically, because the first frame and the second frame include identical sequence numbers, the end system may discard either the first frame or the second frame.

Modifications, additions, or omissions may be made to method 900 without departing from the scope of the present disclosure. For example, the operations of method 900 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:
1. A network, comprising:
  a first device; and
  a second device, each of the first device and the second device configured to:
    increment a count value responsive to generation of an associated frame, wherein the count value at the first device is the same as the count value at the second device;
transmit the associated frame including the count value; and
reset the count value to a predetermined initial count value responsive to a timing event.

2. The network of claim 1, wherein each of the first device and the second device are further configured to compare one or more defined times to a current network time to detect the timing event.

3. The network of claim 1, wherein the first device comprises a master device and the second device comprises a slave device, wherein the first device is configured to define the timing event.

4. The network of claim 1, wherein each of the first device and the second device include an associated sequence counter to generate the count value.

5. The network of claim 4, wherein each of the first device and the second device are configured to reset, responsive to the timing event, its associated sequence counter for a sufficient time duration such that the count value is reset to the initial predetermined count value.

6. The network of claim 1, further comprising a third device configured to:
receive a first frame including the count value from the first device;
receive a second frame including the count value from the second device; and
discard either the first frame or the second frame.

7. A method, comprising:
incrementing, at each of a first device and a second device of a network, a sequence number responsive to generation of an associated frame, the sequence number being indicative of a number of frames generated at an associated device since a reset event; and
inserting, at each of the first device and the second device, the sequence number into the associated frame, wherein the sequence number at the first device is synchronized with sequence number at the second device.

8. The method of claim 7, further comprising resetting, at each of the first device and the second device, the sequence number to an initial predetermined count value responsive to the reset event.

9. The method of claim 8, wherein resetting the sequence number to the initial predetermined count value responsive to the reset event comprises resetting the sequence number to the initial predetermined count value responsive to a timing event.

10. The method of claim 9, further comprising detecting the timing event responsive to a current time being equal to a defined time of one or more defined times.

11. The method of claim 10, further comprising:
receiving, at each of the first device and the second device, a signal indicative of the current time; and
comparing, at each of the first device and the second device, the signal to the one or more defined times to detect the timing event.

12. The method of claim 7, wherein incrementing the sequence number comprises incrementing the sequence number via an associated sequence counter.

13. The method of claim 7, further comprising transmitting the associated frame including the sequence number from each of the first device and the second device.

14. The method of claim 13, further comprising:
receiving, at an end system, a first frame including the sequence number from the first device;
receiving, at the end system, a second frame including the sequence number from the second device; and
discarding, at the end system, either the first frame or the second frame.

15. A device in a communication network, comprising:
a node element configured to:
increment a count value in response to generation of a data frame;
transmit the data frame including the count value via a communication bus; and
reset the count value to an initial predetermined count value responsive to a reset event.

16. The device of claim 15, wherein the node element is further configured to detect the reset event responsive to a current network time being equal to a defined time.

17. The device of claim 15, wherein the node element comprises logic configured to:
receive a signal indicative of a current network time;
compare the signal to one or more defined times to detect the reset event; and
in response to the reset event, convey a second signal to a sequence counter to reset the count value.

18. The device of claim 15, wherein the node element comprises a sequence counter configured to increment the count value in response to generation of the data frame.

19. The device of claim 18, wherein the node element is configured to reset the sequence counter for a sufficient time duration such that the count value is reset to the initial predetermined count value.

20. The device of claim 18, wherein the node element includes logic configured to receive the count value from the sequence counter and insert the count value into an available portion of the data frame.

* * * * *